(No Model.)

C. J. VAN DEPOELE, Dec'd.
C. A. Coffin & A. Wahl, Administrators.
SYSTEM OF ELECTRICAL TRANSMISSION OF POWER.

No. 507,945. Patented Oct. 31, 1893.

Witnesses
H. A. Lamb
C. S. Sturtevant

Inventor
Charles J. VanDepoele
By
Frankland Jannus
Attorney # UNITED STATES PATENT OFFICE.

CHARLES J. VAN DEPOELE, OF LYNN, MASSACHUSETTS; C. A. COFFIN AND ALBERT WAHL, ADMINISTRATORS OF SAID VAN DEPOELE, DECEASED, ASSIGNORS TO THE THOMSON-HOUSTON ELECTRIC COMPANY, OF BOSTON, MASSACHUSETTS.

SYSTEM OF ELECTRICAL TRANSMISSION OF POWER.

SPECIFICATION forming part of Letters Patent No. 507,945, dated October 31, 1893.

Application filed October 23, 1890. Serial No. 369,012. (No specimens.)

*To all whom it may concern:*

Be it known that I, CHARLES J. VAN DEPOELE, a citizen of the United States, residing at Lynn, in the county of Essex and State of Massachusetts, have invented certain new and useful Improvements in Systems of Transmitting Currents of Varying Potential, of which the following is a description, reference being had to the accompanying drawings, and to the letters and figures of reference marked thereon.

My invention relates to a new and improved system of transmitting electric currents of varying potential and also differing in potential, and comprises means whereby I am enabled to take current from a circuit of any available potential above that which it is desired to employ in the translating devices and to transmit rising and falling currents to the translating devices of the desired potential below that of the supply.

In the present instance I have shown and described the invention in connection with a number of reciprocating engines supplied from a five hundred volt circuit, as will be fully hereinafter set forth.

Figure 1:
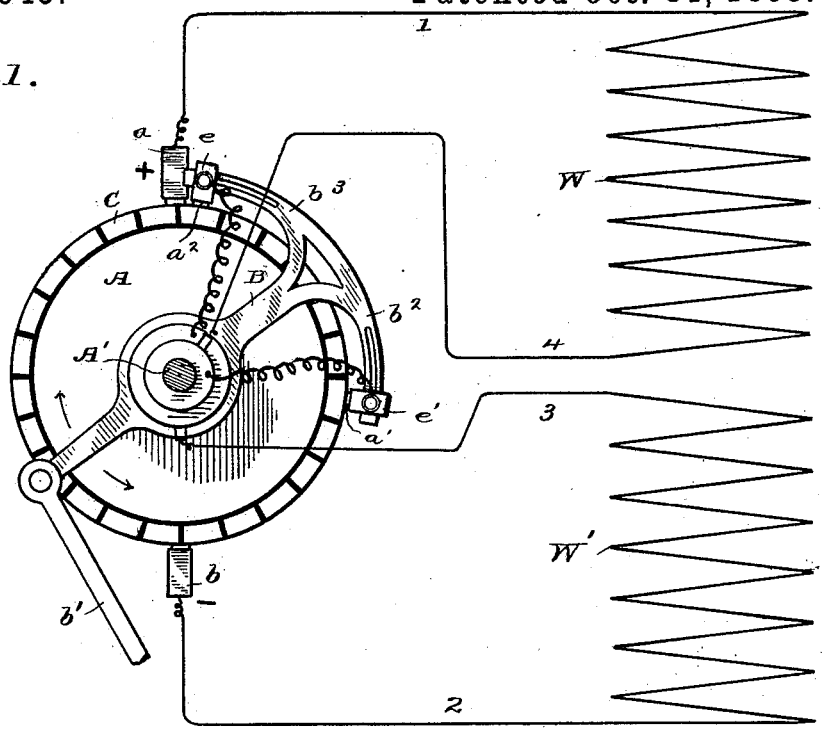
Figure 2:
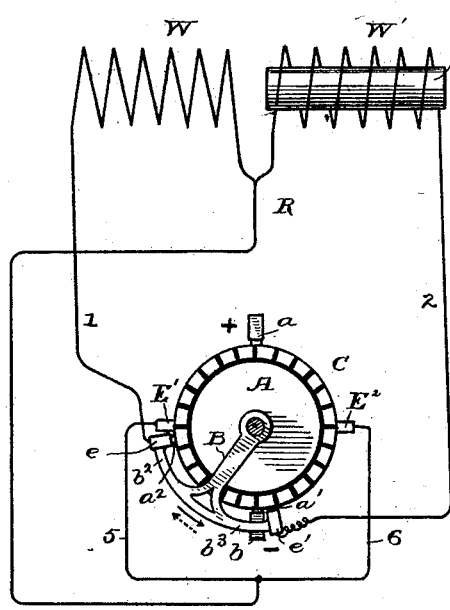
Figure 3:
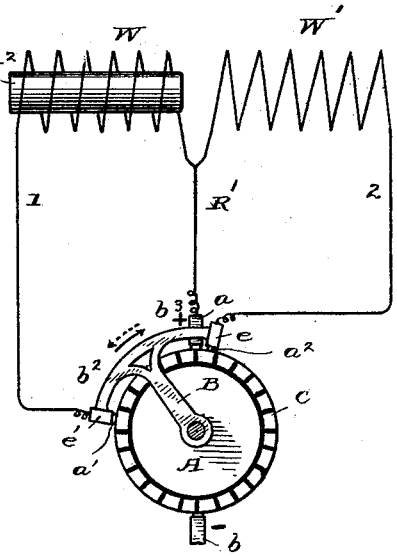

In the drawings—Figure 1 is a diagrammatic representation of an arrangement of apparatus embodying the invention. Figs. 2 and 3 are also diagrammatic views differing somewhat in specific details.

As seen in Fig. 1, A, indicates the armature and C, the commutator of a continuous current dynamo electric machine which, as here indicated, is a generator maintaining a difference of potential of, for instance, five hundred volts, between its positive and negative commutator brushes $a$, $b$. It will be understood, however, that instead of a generator I may employ the machine A, as a counter electro motive force device or distributer the supply circuit being connected to the said main stationary brushes $a$, $b$.

W, W', are motor coils, such for example, as the coils of a double-acting reciprocating engine and within which a magnetic plunger is reciprocated by the rise and fall of currents in said coils alternately, substantially in the manner set forth in my Patent No. 422,855, dated March 4, 1890. The present invention differs from what is set forth in my said prior patent in that by my present invention I am enabled not only to impart a rising and falling character to a previously continuous current but also to adjust the potential of the currents transmitted to the motor coils or other translating devices to any desired maximum potential below that of the source.

W, W', are the motor coils to be supplied with rising and falling currents, and as indicated in Fig. 1, the outside terminals of said coils are connected respectively by conductors 1 and 2, to the stationary commutator brushes $a$, $b$. Upon the armature shaft A', is mounted an arm B, capable of being oscillated upon said shaft. One end of the arm B, is connected to a pitman or other reciprocating part $b'$, which is to be actuated in any convenient manner, the specific means, however, not being deemed to require illustration. The opposite end of the arm B, is provided with brush carrying arms $b^2$, $b^3$, which extend at right angles from the arm B, and are concentric with the commutator cylinder C, but out of the path of the stationary commutator brushes. At or near the extremities of the arms $b^2$, $b^3$, are secured commutator brush carrying boxes $e$, $e'$, which may be adjusted so as to embrace a greater or less number of commutator segments between them. The brushes $a'$, $a^2$, and their boxes, are, of course, well insulated from the arms $b^2$, $b^3$. The inner terminals of the coils W, W', are electrically connected respectively with the brushes $a'$, $a^2$, by conductors 3, 4. When the arm B, is oscillated upon its support by the movement of the pitman $b'$, the arms $b^2$, $b^3$, and the contact brushes carried thereby will be moved radially upon the surface of the commutator C, toward and away from the stationary commutator brushes and with these conditions the current supplied to the coils W, W', will rise and fall in said coils in alternation, the potential of the current supplied to said coils depending upon the difference of potential of the current of the main brushes and the extent of the arc of the commutator included between the moving brushes representing the inner terminals of the coils W, W'.

While I have described the apparatus in Fig. 1 as comprising the motor coils of a double acting reciprocating engine, as set forth in my said patent, the said coils need not necessarily coact, but might be employed independently as reciprocating engine coils or for any purpose to which they are suited. This is evident from the fact that the moving brushes $a'$, $a^2$, are each separately connected with the respective coils so that in said Fig. 1 two separate and independent working circuits W, W', are being supplied with current each having one terminal connected to one of the stationary commutator brushes, and each having its other terminal connected to one of the insulated moving brushes. The potential of the current supplied to these two working circuits W, W', depends entirely upon the amplitude of the movement of the brushes $a'$, $a^2$, upon the commutator cylinder, away from and toward the main brushes.

Fig. 2 shows an arrangement embodying the principles above described in slightly different form. $a, b$, are the main commutator brushes upon the commutator C, of the generator. A second set of permanent or stationary commutator brushes E', E², is located midway between the main brushes $a, b$, and opposite to each other at the points of equal potential upon the commutator. Two moving brushes $a'$, $a^2$, are carried by the extensions $b^2$, $b^3$, of the arm B, substantially as indicated in Fig. 1. The outer terminals of the motor coils W, W', are connected respectively by the conductors 1, 2, to the moving commutator brushes $a'$, $a^2$, while the inner terminals of the said coils are united so as to coact and form a double acting machine for reciprocating the magnetic piston W², and connected by a return conductor R, and conductors 5, 6, to the second set of stationary brushes E', E², upon the points of equal potential upon the commutator. When the radial brush holder B, is moved to and fro upon the commutator C, between the points of maximum and zero electro motive force represented by the main commutator brushes $a, b$, a pulsating current will be sent in alternation to the coils W, W', rising and falling in said coils alternately. Furthermore, the potential of the current supplied to the motor coils will, of course, depend upon the number of sections of the commutator included between the moving brushes which can be determined in any convenient manner, as, for instance, by lengthening or shortening the arms $b^2$, $b^3$.

In Fig. 3 is shown a somewhat different arrangement but organized to produce similar results. The commutator C, is provided with stationary positive and negative brushes $a, b$, and a radial brush holder B, having arms $b^2$, $b^3$, is provided, said arms carrying brushes $a'$, $a^2$. The connections are, however, somewhat different from those in the preceding figure. The outer terminals of the coils W, W', of a double acting reciprocating engine, are connected by conductors 1, 2, with the moving commutator brushes $a'$, $a^2$, respectively, while the inner terminals of the said motor coils are united and connected as by conductor R', with the positive stationary commutator brush $a$. With this arrangement also, as the arm B, is oscillated and the moving brushes caused to travel to and fro upon the commutator cylinder, rising and falling or pulsating currents will be delivered to the motor coils in alternation. The radially moving brush holder may, of course, be actuated in any convenient manner, it being understood that the number of impulses per minute supplied to the motor coils will depend entirely upon the rate of movement of the moving brushes while the potential of the said pulsating currents will be determined by the arc of the commutator included between the said brushes when in fixed relation to each other, or between each of the moving brushes and the main stationary brushes $a, b$.

Various minor modifications and changes in the above described system will suggest themselves to persons skilled in the art and may be made in accordance with the principles set forth in the foregoing without departing from the spirit of the invention.

Having described my invention, what I claim, and desire to secure by Letters Patent, is—

1. In a system of distributing defined rising and falling currents, the combination with the sectional commutator of a continuous current machine, and the main stationary brushes thereof, of a working circuit one terminal of which is connected to one of the stationary commutator brushes, an auxiliary commutator brush and connections therefrom to the other terminal of the working circuit, and means for moving the auxiliary brush over a pre-determined number of commutator sections, less than the total number between the main brushes and thereby transmitting to the said working circuits rising and falling currents of a lower maximum potential than that existing between the main commutator brushes.

2. The combination with the commutator of a continuous current generator or distributer, of main stationary commutator brushes thereon, an arm moving radially to said commutator and provided with extensions and with commutator brushes carried in adjustable commutator brush holders upon said extensions, and means, substantially as described, for imparting a radial movement to the commutator brush boxes and brushes over a limited number of the commutator sections to collect currents having a maximum potential less than that between the main brushes.

3. The combination with the commutator of a continuous current generator or distributer, and main stationary brushes upon the points of maximum and zero potential thereon, a movable brush or brushes and means for moving the same toward and away from the stationary brushes, over a part only of the commutator sections, a working circuit or circuits connected to the stationary and moving commutator brush or brushes and to the moving brush or brushes whereby the moving brushes will distribute rising and falling currents to the circuit or circuits connected therewith, said currents having a maximum potential less than the initial potential of the machine depending upon the number of commutator sections covered by the movements of the moving brushes.

4. The combination with the commutator of a continuous current generator or distributer, of one or more main stationary commutator brushes upon the line of commutation, one or more working circuits, one terminal of each being connected to one of the main stationary commutator brushes, a movable commutator brush or brushes, and means for moving said brush or brushes over a predetermined number of commutator sections, less in number than those between the stationary brushes, and connections from the other terminal or terminals of the working circuit or circuits to the movable commutator brushes, whereby rising and falling currents are transmitted to the said working circuits at a reduced maximum potential.

In testimony whereof I affix my signature in presence of two witnesses.

CHAS. J. VAN DEPOELE.

Witnesses:
JOHN W. GIBBONEY,
CHAS. H. OLM.